United States Patent Office 3,333,265
Patented July 25, 1967

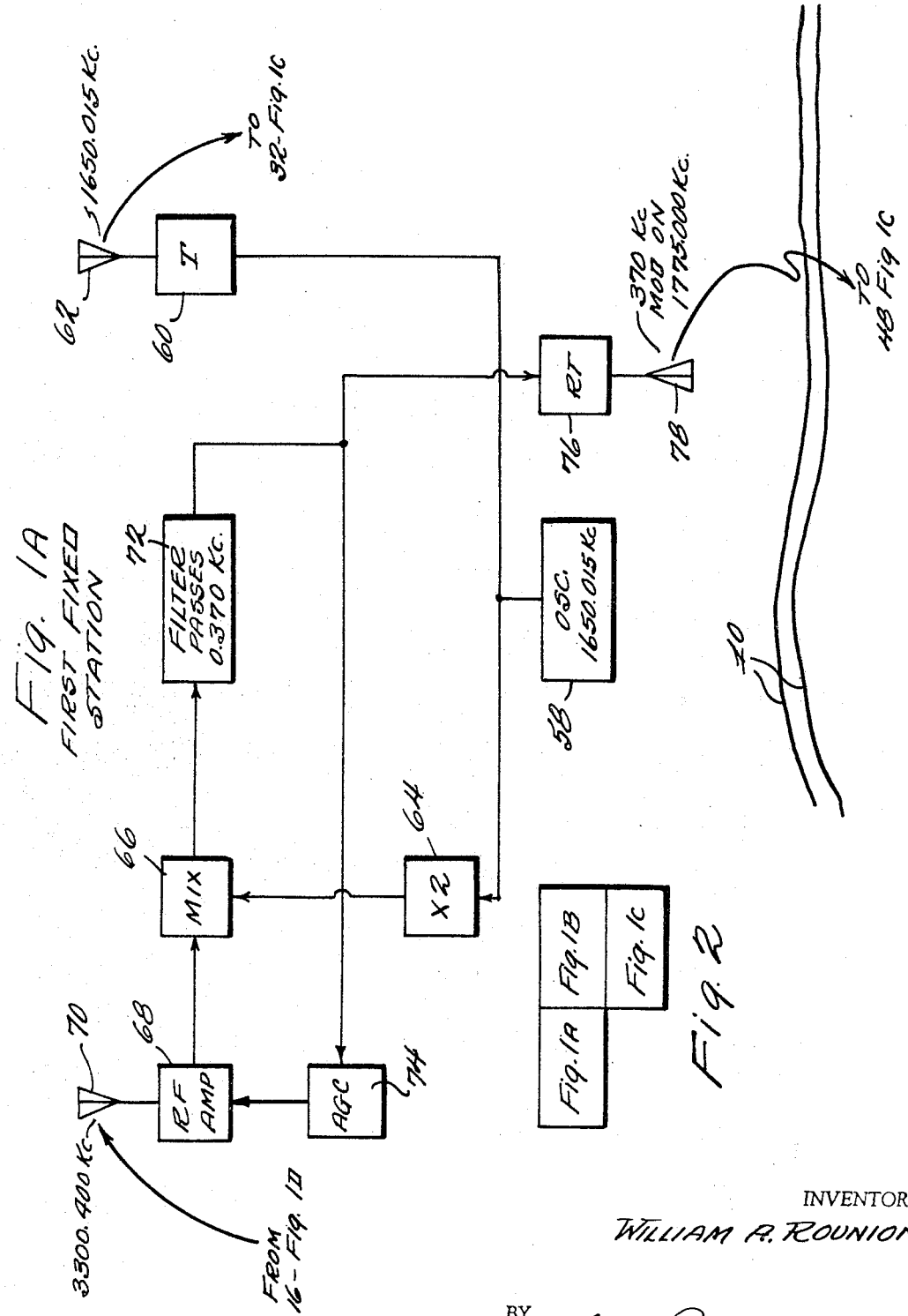

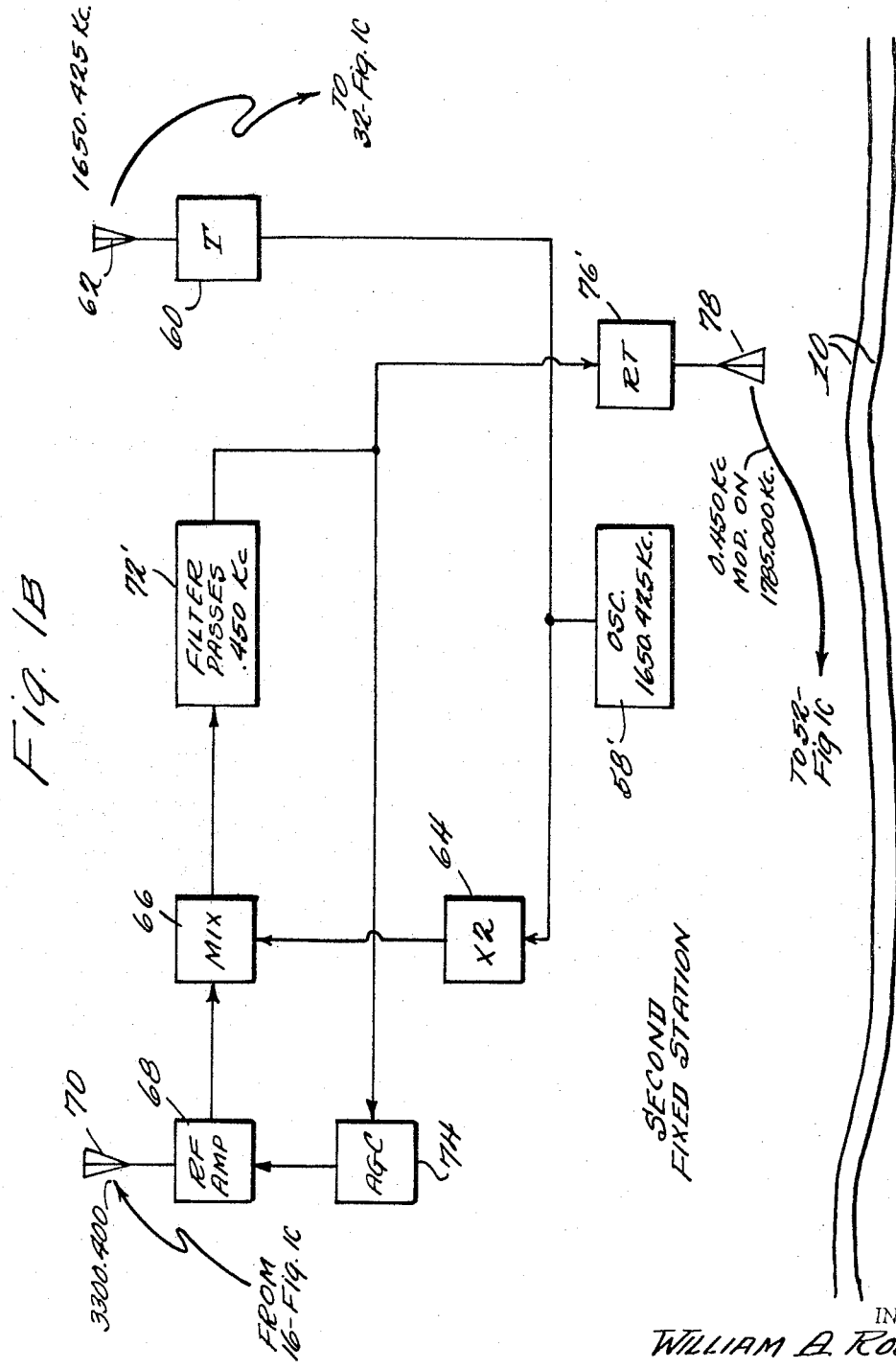

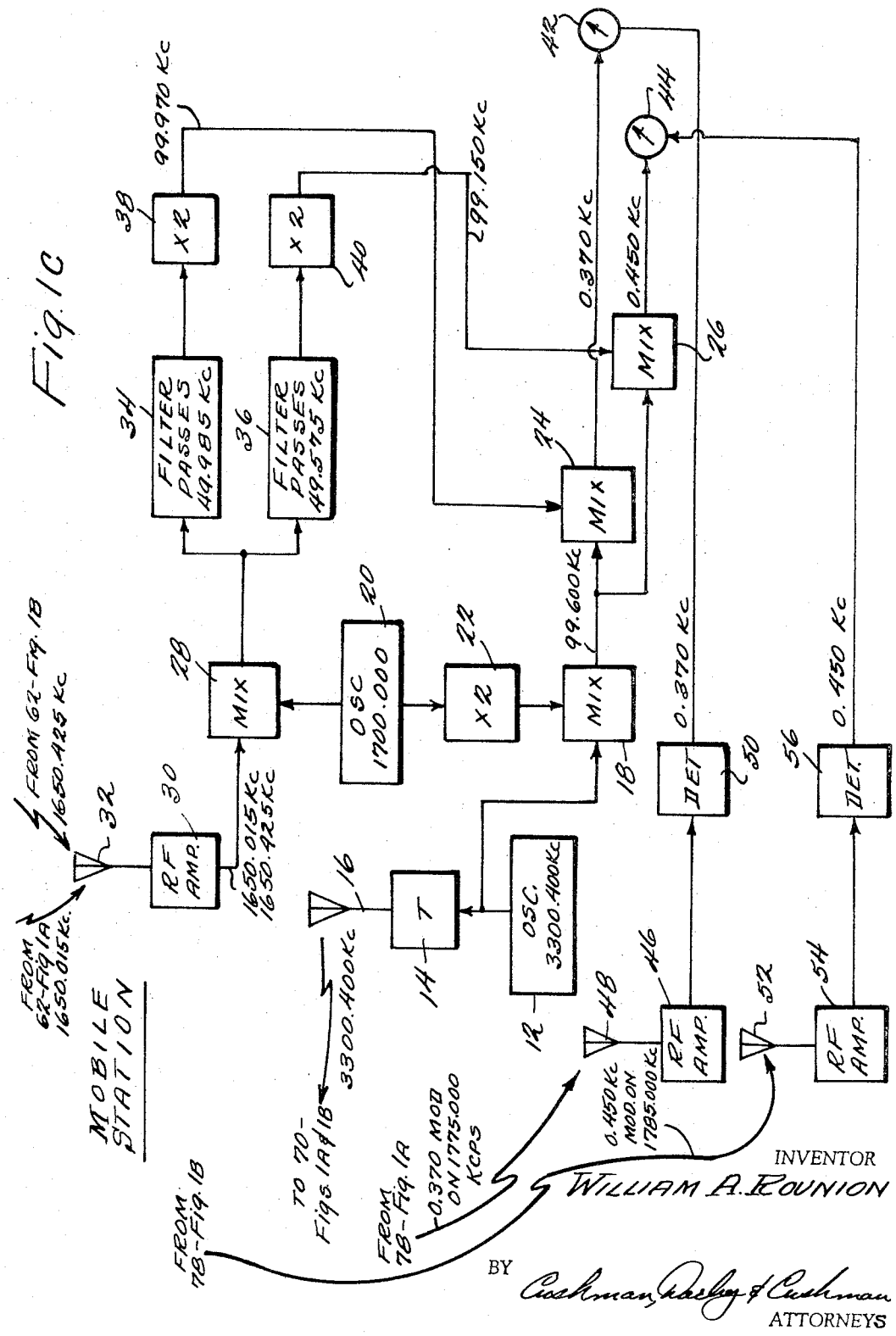

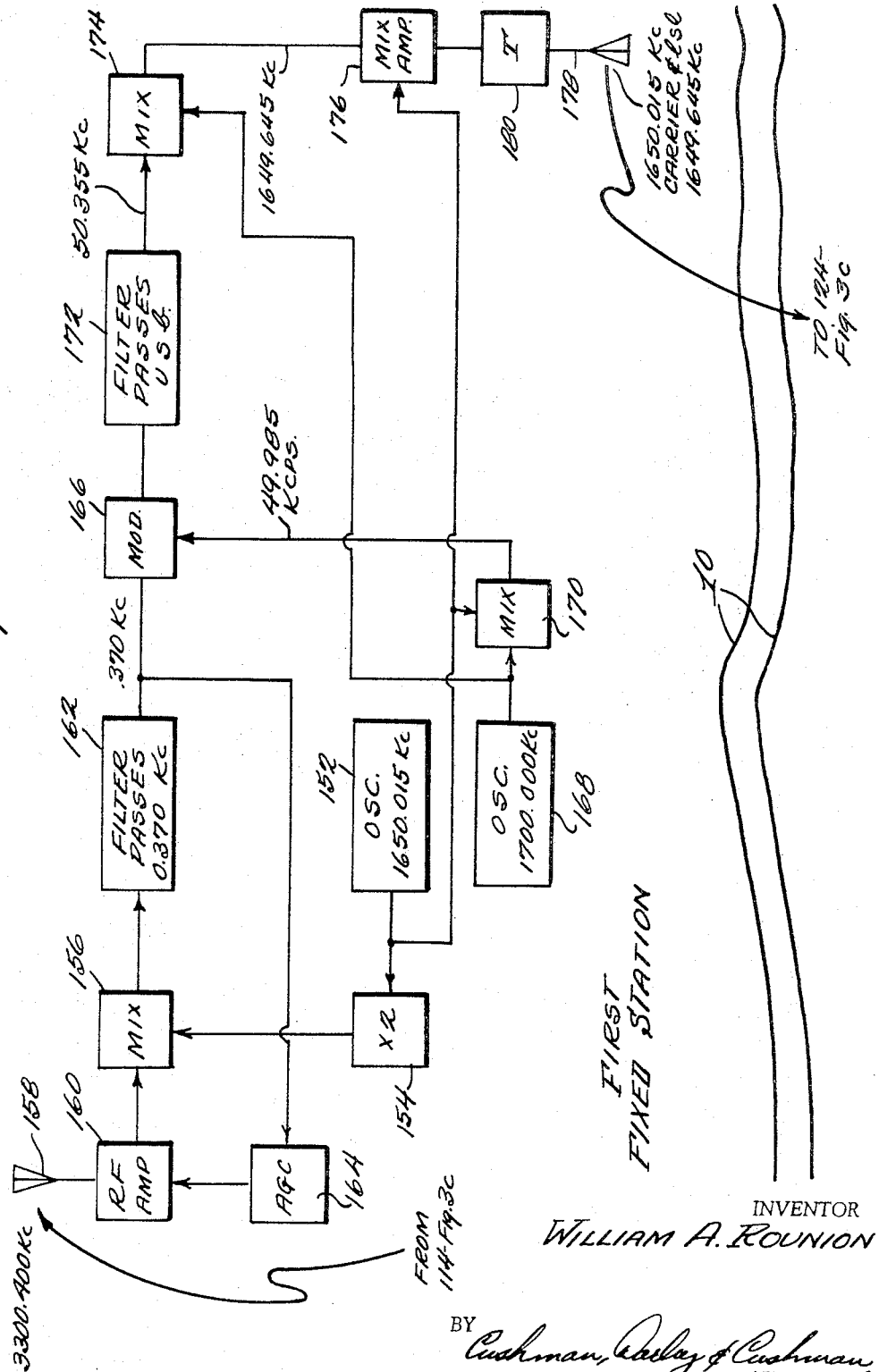

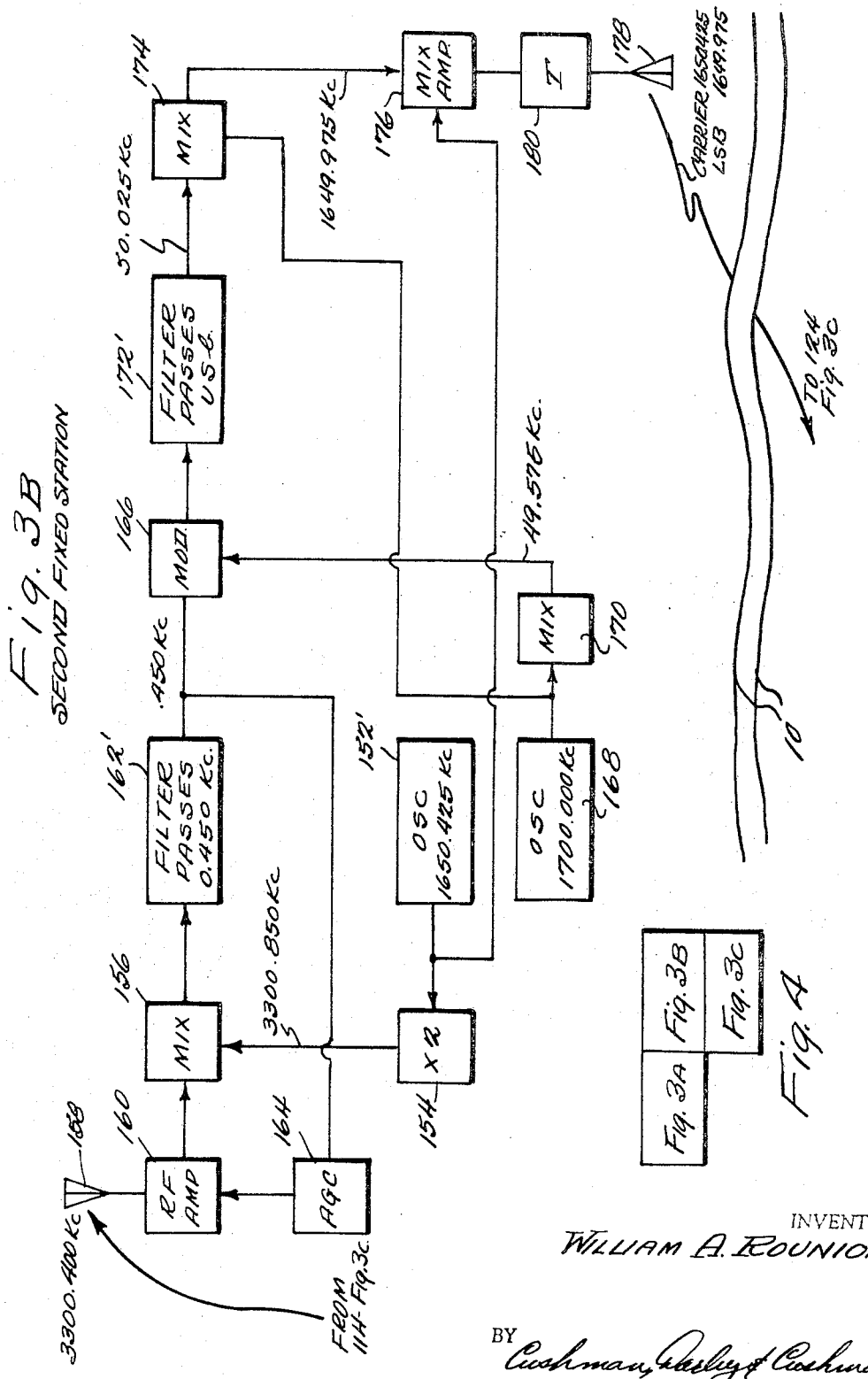

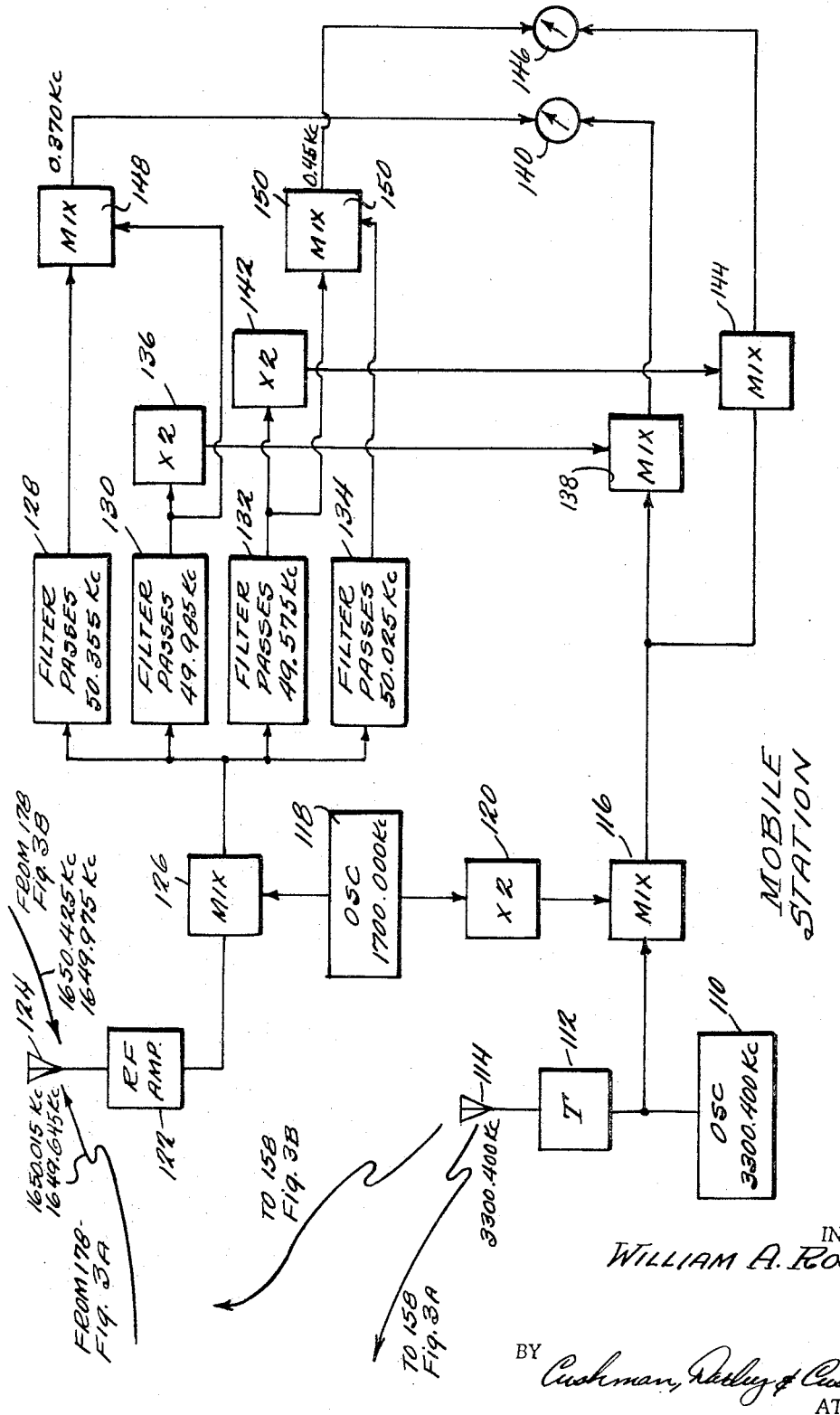

3,333,265
MULTI-DIMENSIONAL NAVIGATION SYSTEM WITH MINIMUM FREQUENCY REQUIREMENT
William A. Rounion, Hampton, Va., assignor to Hastings-Raydist, Inc., Hampton, Va., a corporation of Virginia
Filed Dec. 9, 1965, Ser. No. 512,703
2 Claims. (Cl. 343—12)

ABSTRACT OF THE DISCLOSURE

Heterodyne phase comparison iso-phase navigation systems in which use of intermediate heterodyning steps avoids requirement for additional frequency "channel" allocation for additional users or dimensions above one.

---

This invention relates to heterodyne phase comparison navigation systems.

In accordance with a feature of the present invention, means are included for providing systems having intersecting lines of zero phase shift within a very minimum frequency allocation. This is accomplished by a new technique involving the segregating of received signals and acting upon same. The various objects and advantages afforded by the several features of the present invention will become clear from the following detailed description of illustrative embodiments thereof, and from the appended claims.

The illustrative embodiments may be best understood with reference to the accompanying drawings wherein:

FIGURE 1, being made up by joining the sheets identified as FIGURES 1A, 1B and 1C, shows inventive features illustrated in a double range system;

FIGURE 2 is a diagram showing how FIGURES 1A–1C are to be joined together;

FIGURE 3, made up of FIGURES 3A, 3B and 3C, shows certain additional inventive features incident to relaying of heterodyne frequencies as a side band of a carrier frequency which is a main navigation frequency;

FIGURE 4 is a diagram showing how FIGURES 3A–3C are to be joined together.

Now referring to FIGURE 1, the various components, generally shown as rectangles and bearing suitable legends, are given reference characters of three digits or less. All numbers on the drawings of four or more digits, e.g., 0.370 are exemplary values of frequencies in kilocycles per second (kc.).

FIGURE 1 shows a mobile station in the lower half of the figure and above it, to the left, a first fixed station, and to the right thereof, and above the mobile station, a second fixed station. It may be taken for example that the fixed stations are on land separated from the mobile station by a coastline designated by the double line 10. As will be well understood, the mobile station may be a ship, an aircraft or any other movable craft.

The mobile station includes an oscillator 12, feeding transmitting circuitry 14 which radiates a first navigation signal via antenna 16. Taking 3300.400 kc. as an exemplary continuous wave signal generated in 12, this is radiated from 16 to both fixed stations. 3300.400 kc. is also applied to a mixing or heterodyning circuit 18. The mobile station is further provided with a local oscillator 20 generating, for example, 1700.000 kc. This signal is applied to a multiplication circuit 22 which, for example, multiplies the signal by 2 and this is also applied to the mixing circuit 18. The difference "beat" signals from 18, at 99.600 kc., is applied to further mixing circuits 24 and 26 for a purpose which will be later explained. The output of 20 is also applied to mixing circuit 28, the other input of which is derived from a radio frequency amplifying circuit 30 which is fed from antenna 32. The latter receives signals from the fixed stations, as will be explained hereinafter.

At the mobile station, the output of mixing station 28 is applied to band pass filters 34 and 36. These pass only the difference beat frequency signals from mixer 28. The output of filter 34 is multiplied by a certain factor, in this case 2, in circuit 38. Similarly, the output of filter 36 is multiplied by 2 in circuit 40. The output of circuit 38 is applied as the second input to mixing circuit 24. The output of circuit 40 is applied as the second input to mixing circuit 26. The output of mixing circuit 24 is connected as one input to a phase angle measuring device 42. The output of a mixing circuit 26 is applied as one input to a phase angle measuring device 44.

In the mobile station, a radio frequency amplifying circuit 46 is provided for receiving, through antenna 48, a heterodyne or beat frequency signal relayed from the first fixed station. Amplifying circuit 46 feeds a detector circuit 50, which detects a modulation upon the carrier amplified at 46. The output of 50 is applied as the second input to phase angle measuring device 42. The beat frequency signal relayed from the second fixed station is induced in antenna 52, amplified in circuit 54, detected in circuit 56 and applied as the second input to phase angle measuring device 44.

The first fixed station is equipped with an oscillator 58 which feeds transmitting circuits 60, which radiate via antenna 62 a signal here taken, for example, as 1650.015 kc. The output of 58 is also applied to multiplication circuit 64 which, for example, multiplies by 2 and feeds mixing circuit 66. The latter is otherwise fed from a radio frequency amplifying circuit 68, receiving signals via antenna 70. Amplifying circuit 68 is tuned to amplify the 3300.400 kc. signal from the mobile station. The first fixed station is further provided with band pass filter 72 which passes the 0.370 kc. difference signal from mixer 66, this existing because oscillator 58 is set at 1650.015 kc. The output from filter 72 is applied through AGC circuit 74 to amplifier 68 and is also fed to a relay transmitter 76. The latter radiates via antenna 78 a carrier signal, for example, 1775.000 kc., on which is modulated the 0.370 kc. signal generated in mixer 66. This modulated signal is detected at 50 of the mobile station.

The second fixed station is the same as the first and the same reference characters are therefore applied to the components with the exception that the local oscillator is designated 58′ because it is to be set at a slightly different frequency than 58 at the first fixed station. For example, 58′ is at 1650.425 kc. Also the filter is 72′, being designed to pass 0.450 kc. The relay transmitter is 76′ because its carrier is different from that of 76, 76′ being 1785.000 kc.

Referring again to the mobile station, in accordance with the exemplary values employed, amplifier 30 is tuned to amplify 1650.015 kc. from the first fixed station and 1650.425 kc. from the second fixed station. Filter 34 is tuned to pass 49.985 kc. but to block 49.575 kc. Filter 36 passes the latter but blocks 49.985 kc. Amplifier 46 is tuned to 1775.000 kc. and side bands thereof, permitting detector 50 to detect the 0.370 kc. modulation thereon from the first fixed station, but to exclude the 0.450 kc. which is a modulation upon the 1785.000 carrier from the second fixed station, to which amplifier 54 is tuned. The latter excludes the relay transmission from the first fixed station.

In operation, mixing circuit 66 at the first fixed station heterodynes between the navigation frequency 3300.400 kc. from the mobile station and 1650.015×2 kc. generated thereat to produce the audio note 0.370 kc. The latter is relayed via 76 to 46 at the mobile station and is applied to phase meter 42. Concurrently the 1650.015 kc. signal radiated from 60 at the first fixed station is mixed at 28 (mobile station) with 1700.000 from oscillator 20 and the difference frequency 49.985 kc., which passes filter 34 and is doubled at 38, is mixed at 24 with the difference output of mixer 18. The output of 18 is the difference between the 3300.400 kc. signal generated at 12 and the 1700.000×2 kc. generated by circuits 20 and 22. Therefore, the output of 24 is 0.370 kc., which is applied as the other input to phase meter 42. As will be understood from the general principles of the heterodyne phase comparison technique, phase meter 42 will remain at a given reading so long as the distance between the mobile station and the first fixed station remains constant. This will result if the mobile station remains stationary or confines its movement along a circular path having the first fixed station as a center.

Phase meter 44 similarly reacts to any change in the distance between the mobile station and the second fixed station. In this case, at the mobile station, amplifier 54 receives the relay of the 0.450 kc. frequency as a modulation on 1785.000 kc. and the output of 56 is applied to phase meter 44. The second fixed station receives 3300.400 at 70, which is amplified by 68, mixed with 1650.425×2 in mixing circuit 66, and the difference frequency of 0.450 kc. is passed by 72′ and relayed by 76′ to 54. At the mobile station amplifier 30 also amplifies the 1650.425 kc. navigation signal from the second fixed station. This is mixed, along with the navigation frequency from the first fixed station, in mixing station 28. The 49.575 kc. difference signal, which exists due to the navigation frequency from the second fixed station, passes filter 36, is doubled in 40, is mixed in 26 with 99.600 kc. from 18 and the resulting 0.450 kc. difference frequency is applied as the other input to phase meter 44.

It will be understood that while, for convenience, separate antenna symbols are shown at 16, 32, 48 and 52 at the mobile station, these could be one structure feeding the respective amplifiers and transmitter. Similarly, the antennas 62, 70 and 78, at the fixed stations, could be consolidated into one structure.

Now referring to FIGURES 3 and 4, FIGURE 3 is made up of FIGURES 3A–3C inclusive, to be joined together as shown in FIGURE 4.

The system of FIGURE 3 operates upon the same basic principles as that of FIGURE 1, except modified to provide for the relaying of signals from the remote stations (FIGS. 3A and 3B) to the mobile station (FIG. 3C) as modulations upon lower side bands of the navigation frequencies radiated therefrom.

At the mobile station of FIGURE 3, and again using exemplary frequencies, a signal at 3300.400 kc. from oscillator 110 is radiated via transmitter circuits 112 and antenna 114. The signal from 110 is also applied to mixing circuit 116, the other input to which is the output of oscillator 118 at 1700.000 kc. doubled in multiplier circuit 120.

The mobile station is also supplied with radio frequency amplifying circuits 122 which receive signals from the remote stations, as described later, at frequencies of 1650.015 kc. of 1649.645 kc. 1650.425 kc. and 1649.975 kc., all via receiving antenna 124. The aforesaid signals as amplified in 122 are applied to mixing circuit 126, the second input of which is from oscillator 118. The signals emanating from 126 are applied in parallel to filter circuits 128, 130, 132 and 134. 128 passes 50.355 kc. and blocks all other frequencies from 126. 130 passes 49.985 kc. and blocks the other signals. 132 passes 49.575 kc. and blocks the other signals. 134 passes 50.025 kc. and blocks the other signals. The 49.985 kc. signal from 130 is doubled in circuit 136 and applied to mixing circuit 138 which otherwise receives a signal at 99.600 kc. from mixing circuit 116. The output of 138 at 0.370 kc. is applied as one input to a phase angle indicating device 140. The output of filter 132 is doubled in circuit 142 and applied to mixing circuit 144, the other input of which is the 99.600 kc. signal from 116. The output of 144 at 0.450 kc. is applied as the phase input to another phase angle measuring device 146.

The output signal at 49.985 kc. from filter 130 is also applied to mixing circuit 148. A signal at 50.355 kc. from filter 128 is also applied to mixing circuit 148. The output of 148 at 0.370 kc. is applied as the second input to phase angle indicating device 140. The output from filter 134 at 50.025 kc. is applied to mixing circuit 150, the other input to which is the signal at 49.575 kc. from filter 132. The output of 150 at 0.450 kc. is applied as the second input to phase angle indicating device 146.

At the fixed station of FIGURE 3A an oscillator 152 generates a signal at 1650.015 kc. This is doubled in circuit 154 and applied to mixing circuit 156. The 3300.400 kc. signal from the mobile station is received via antenna 158, amplified in circuit 160 and applied as a second input to mixer 156. The output of 156 is applied to filtering circuit 162 which passes the output of 156 which is at 0.370 kc. This is applied through an automatic gain control circuit 164 to the amplifier 160 and is also applied to a modulating circuit 166. The fixed station of FIGURE 3A is also provided with an oscillator 168 generating a signal at 1700.000 kc., the output thereof being applied to mixing circuit 170. The second input to 170 is the 1650.015 kc. signal from 152. The output of mixer 170 is applied as the second input to modulation circuit 166. The output of 170 includes the difference frequency 49.985 kc. Therefore, the output of modulation circuit 166 includes 49.985 kc. as a carrier, with an upper side band at 50.355 kc. This is applied to filter 172 which passes only said upper side band which is then applied as an input to mixing circuit 174. The second input of 174 is a signal at 1700.000 kc. from circuit 168. From 174 the difference frequency 1649.645 kc. is applied to a mixing amplifier circuit 176, the other input to which is 1650.015 kc. from oscillator 152. The output of 176 is radiated from antenna 178 via transmitter circuitry 180. The signal radiated from 178 is the carrier at 1650.015 kc. and a lower side band thereof at 1649.645 kc. The latter frequencies are among those received, as explained earlier at the anetnna 124 and amplified in the circuit 122 of the mobile station.

Next referring to the second fixed station shown in FIGURE 3B, this circuit is formed and operates the same as the fixed station of FIGURE 3A. Therefore, the same characters are applied, with the exception that the oscillator corresponding to 152 of FIGURE 3A is designated 152′ of FIGURE 3B because it operates at a frequency of 1650.425 kc. Also, the filter corresponding to 162 of FIGURE 3A is here designated 172′ because it is adjusted to pass the upper side band at 50.025 kc. In operation it will be seen that the fixed station of FIGURE 3B radiates from antenna 178 to the antenna 124 at the mobile station, the carrier at 1650.425 kc. having a lower side band at 1649.975 kc.

It will now be seen that the system of FIGURE 3 is reduced in frequency channel requirements to a minimum of two, one channel to accommodate the 3300.400 kc. radiated from the mobile station, and the other to accommodate the carriers at 1650.015 kc. (FIG. 3A), and 1650.425 (FIG. 3B) and the lower side bands thereof. By use of the local oscillator 118 at the mobile station (FIG. 3C) and the filtering system comprising 128, 130, 132, 134 it is possible to segregate the various signals at the mobile station for application of the respective tones to the phase angle indicating devices 140 and 146.

Referring now generally to the systems of FIGURES 1 and 3, it will be seen that by the incorporation of features as described and hereinafter claimed, the number of distinct frequencies has been reduced from that required in earlier described systems, without diminishing the accuracy and reliability thereof.

The foregoing detailed descriptions of illustrative embodiments have been given for purposes of illustrating the various inventive features and the scope of the latter are to be determined from appended claims.

What is claimed is:

1. In a heterodyne phase comparison radio navigation system, at least three spaced apart stations for providing intersecting line of zero phase shift along which one of the stations may be navigated, means for transmitting a navigation signal having a frequency $f_1$ from one of the stations, means for transmitting a naviagation signal having a frequency $f_2$ from a second of the stations, means for transmitting a navigation signal having a frequency $f_3$ from a third of the stations, means for receiving $f_2$ and $f_3$ and segregating same into separate channels comprising means for generating a signal at frequency $f_4$ and heterodyning between $f_2$ and $f_4$ and between $f_3$ and $f_4$, first filter means connected to pass only the heterodyne beat frequency signal $f_5$ which is the difference between $f_2$ and $f_4$, second filter means connected to pass only the signal $f_6$ which is the difference between $f_3$ and $f_4$, means to heterodyne between $f_5$ and a multiple $n$ of $f_4$, and means to heterodyne between $f_6$ and a multiple $n$ of $f_4$, wherein each of $f_1$ through $f_6$ is a different frequency and $n$ may be 1 or any other number.

2. A heterodyne phase comparison navigation system having a mobile station and at least two spaced apart fixed stations, means for transmitting a navigation signal at frequency $f_1$ from the mobile station, means for transmitting from a first fixed station a signal at frequency $f_2$ which is a multiple $n$ of $f_1 + a$, means for transmitting from a second fixed station a signal at frequency $f_3$ which is the multiple $n$ of $f_1 + b$, means for receiving $f_1$ at the first fixed station and there heterodyning same with $nf_1 + a$ to produce a signal of frequency $a$, means for relaying $a$ to the mobile station, means for receiving $f_1$ at the second fixed station and there heterodyning same with $nf_1 + b$ to produce a signal of frequency $b$, means for relaying $b$ to the mobile station, means for receiving $f_2$ and $f_3$ at the mobile station, means at the mobile station utilizing the factor $n$ to bring $f_1$ and $f_2$ to within value $a$ of each other for the case where the mobile station remains a given distance from the first fixed station, means at the mobile station utilizing the factor $n$ to bring $f_1$ and $f_3$ to within value $b$ of each other for the case where the mobile station remains a given distance from the second fixed station, means at the mobile station for applying $a$ as relayed thereto to one input of a first phase angle measuring device and $a$ as generated at the mobile station to the other input of the first phase angle measuring device, means at the mobile station for applying $b$ as relayed thereto to one input of a second phase angle measuring device and $b$ as generated at the mobile station to the other input of the second phase angle measuring device, the means at the mobile station for generating $a$ and $b$ including means to heterodyne $f_2$ and $f_3$ as received with a distinct signal at a frequency $f_4$ which is different in value than $f_2$ or $f_3$ and greater than $a$ or $b$ and separating by filter means the difference frequency between $f_2$ and $f_4$ from the difference frequency between $f_3$ and $f_4$, wherein each of $f_1$, $f_2$, $f_3$, $a$ and $b$ are different frequencies and $n$ may be 1 or any other number.

References Cited
UNITED STATES PATENTS

| | | | |
|---|---|---|---|
| 2,654,884 | 10/1953 | Palmer | 343—12 X |
| 2,907,999 | 10/1959 | Wadley | 343—105 X |
| 2,947,984 | 8/1960 | Hastings | 343—105 |
| 3,229,285 | 1/1966 | Wadley | 343—105 X |

RODNEY D. BENNETT, *Primary Examiner.*

CHESTER L. JUSTUS, *Examiner.*

H. C. WAMSLEY, *Assistant Examiner.*